(12) United States Patent
Deragården et al.

(10) Patent No.: US 10,515,553 B2
(45) Date of Patent: Dec. 24, 2019

(54) METHOD OF CONTROLLING INTER-VEHICLE GAP(S)

(71) Applicant: VOLVO TRUCK CORPORATION, Göteborg (SE)

(72) Inventors: Hans Deragården, Kullavik (SE); Lennart Cider, Mölndal (SE)

(73) Assignee: Volvo Truck Corporation, Göteborg (SE)

( * ) Notice: Subject to any disclaimer, the term of this patent is extended or adjusted under 35 U.S.C. 154(b) by 108 days.

(21) Appl. No.: 15/553,398

(22) PCT Filed: Feb. 24, 2016

(86) PCT No.: PCT/EP2016/053888
§ 371 (c)(1),
(2) Date: Aug. 24, 2017

(87) PCT Pub. No.: WO2016/135207
PCT Pub. Date: Sep. 1, 2016

(65) Prior Publication Data
US 2018/0126931 A1 May 10, 2018

(30) Foreign Application Priority Data
Feb. 26, 2015 (WO) .................. PCT/EP2015/054029

(51) Int. Cl.
*G06F 19/00* (2018.01)
*G06G 7/70* (2006.01)
(Continued)

(52) U.S. Cl.
CPC ........... *G08G 1/22* (2013.01); *B60R 16/0233* (2013.01); *B60W 10/10* (2013.01); *B60W 10/18* (2013.01);
(Continued)

(58) Field of Classification Search
None
See application file for complete search history.

(56) References Cited

U.S. PATENT DOCUMENTS 5,331,561 A * 7/1994 Barrett .................... G05D 1/024
340/903
5,400,864 A * 3/1995 Winner ............... B60K 31/0008
180/169
(Continued)

FOREIGN PATENT DOCUMENTS

EP 2390744 A1 11/2011
JP 2000330637 A 11/2000
(Continued)

OTHER PUBLICATIONS

Japanese Official Action (dated Feb. 19, 2019) for corresponding Japanese Application 2017-545270.
(Continued)

*Primary Examiner* — Bhavesh V Amin
(74) *Attorney, Agent, or Firm* — WRB-IP LLP

(57) ABSTRACT

A vehicle is configured to perform the steps of: obtaining an indicator of a potential collision threat identified by an autonomous emergency braking system of the vehicle, wherein the autonomous emergency braking system of the vehicle comprises pre-defined control phases, and wherein the indicator at least partly determines a current control phase of the autonomous emergency braking system; and sending the obtained indicator to one or more following vehicles.

7 Claims, 5 Drawing Sheets

(51) Int. Cl.
  *G08G 1/00* (2006.01)
  *G05D 1/02* (2006.01)
  *G08G 1/16* (2006.01)
  *B60W 10/10* (2012.01)
  *B60W 10/18* (2012.01)
  *B60W 30/16* (2012.01)
  *B60W 30/165* (2012.01)
  *G05D 1/00* (2006.01)
  *B60R 16/023* (2006.01)

(52) U.S. Cl.
  CPC .......... *B60W 30/16* (2013.01); *B60W 30/162* (2013.01); *B60W 30/165* (2013.01); *G05D 1/0088* (2013.01); *G05D 1/0278* (2013.01); *G05D 1/0293* (2013.01); *G05D 1/0295* (2013.01); *G08G 1/161* (2013.01); *B60W 2300/10* (2013.01); *B60W 2300/125* (2013.01); *B60W 2550/10* (2013.01); *B60W 2550/408* (2013.01); *B60W 2710/18* (2013.01); *G05D 2201/0213* (2013.01)

(56) References Cited

U.S. PATENT DOCUMENTS

| | | | | |
|---|---|---|---|---|
| 5,646,612 A * | 7/1997 | Byon | B60K 28/10 | 340/436 |
| 5,680,122 A * | 10/1997 | Mio | G05D 1/0246 | 180/167 |
| 5,777,451 A * | 7/1998 | Kobayashi | B61L 23/34 | 180/169 |
| 6,032,097 A * | 2/2000 | Iihoshi | G05D 1/0293 | 701/96 |
| 6,067,031 A * | 5/2000 | Janky | G01S 5/0072 | 180/169 |
| 6,188,950 B1 * | 2/2001 | Tsutsumi | B60K 31/0008 | 180/170 |
| 6,265,990 B1 * | 7/2001 | Isogai | B60K 31/0008 | 340/435 |
| 6,285,929 B1 * | 9/2001 | Hashimoto | G05D 1/024 | 180/168 |
| 6,356,820 B1 * | 3/2002 | Hashimoto | G08G 1/22 | 180/167 |
| 6,397,149 B1 * | 5/2002 | Hashimoto | G05D 1/0297 | 455/99 |
| 6,418,370 B1 * | 7/2002 | Isogai | B60K 31/0008 | 180/170 |
| 6,650,984 B1 * | 11/2003 | Rao | B60R 21/013 | 342/42 |
| 6,765,495 B1 * | 7/2004 | Dunning | G08G 1/161 | 340/435 |
| 7,085,637 B2 * | 8/2006 | Breed | B60N 2/2863 | 340/440 |
| 7,425,903 B2 * | 9/2008 | Boss | G08G 1/162 | 340/435 |
| 7,653,473 B2 * | 1/2010 | Yoshida | G08G 1/161 | 701/96 |
| 8,150,583 B2 * | 4/2012 | Danner | B60R 21/0134 | 180/167 |
| 8,229,618 B2 * | 7/2012 | Tolstedt | G05D 1/0231 | 701/23 |
| 8,260,537 B2 * | 9/2012 | Breed | G08G 1/161 | 701/301 |
| 8,289,186 B2 * | 10/2012 | Osafune | G08G 1/20 | 340/435 |
| 8,489,305 B2 * | 7/2013 | Arai | B60W 10/06 | 180/170 |
| 8,620,517 B2 * | 12/2013 | Caveney | G05D 1/0295 | 701/31.5 |
| 8,660,779 B2 * | 2/2014 | Shida | B60W 30/16 | 701/117 |
| 8,738,275 B2 * | 5/2014 | Shida | G08G 1/22 | 701/117 |
| 8,965,677 B2 * | 2/2015 | Breed | B60W 30/04 | 701/301 |
| 9,036,026 B2 * | 5/2015 | Dellantoni | G01C 21/3602 | 348/148 |
| 9,058,246 B2 * | 6/2015 | Shida | B60T 7/22 | |
| 9,202,379 B2 * | 12/2015 | Yamashiro | G08G 1/22 | |
| 9,384,666 B1 * | 7/2016 | Harvey | G05D 1/0088 | |
| 9,396,661 B2 * | 7/2016 | Okamoto | G08G 1/22 | |
| 9,423,794 B2 * | 8/2016 | Lind | G05D 1/0278 | |
| 9,494,944 B2 * | 11/2016 | Alam | B60W 30/16 | |
| 9,511,751 B2 * | 12/2016 | Zagorski | G08G 1/166 | |
| 9,852,554 B2 * | 12/2017 | Nix | G07C 5/008 | |
| 10,042,365 B2 * | 8/2018 | Switkes | G08G 1/166 | |
| 10,078,338 B2 * | 9/2018 | Smartt | G05D 1/0088 | |
| 10,234,871 B2 * | 3/2019 | Klaus | G01G 19/086 | |
| 10,254,764 B2 * | 4/2019 | Laubinger | G05D 1/0272 | |
| 2003/0030583 A1 * | 2/2003 | Finn | B60R 21/013 | 342/70 |
| 2003/0106732 A1 * | 6/2003 | Watanabe | B60T 7/22 | 180/169 |
| 2004/0078133 A1 * | 4/2004 | Miller | B60K 31/0008 | 701/96 |
| 2004/0245853 A1 * | 12/2004 | Odagawa | G08G 1/162 | 303/191 |
| 2006/0195250 A1 * | 8/2006 | Kawaguchi | B60W 30/165 | 701/117 |
| 2009/0037055 A1 * | 2/2009 | Danner | B60R 21/0134 | 701/45 |
| 2009/0210114 A1 | 8/2009 | Baumann et al. | | |
| 2010/0019891 A1 * | 1/2010 | Mudalige | G08G 1/163 | 340/425.5 |
| 2010/0134320 A1 | 6/2010 | Chevion et al. | | |
| 2010/0256836 A1 * | 10/2010 | Mudalige | G08G 1/163 | 701/2 |
| 2010/0256852 A1 * | 10/2010 | Mudalige | G08G 1/163 | 701/24 |
| 2011/0106391 A1 * | 5/2011 | Shida | B60W 30/165 | 701/96 |
| 2011/0246156 A1 * | 10/2011 | Zecha | G08G 1/166 | 703/6 |
| 2011/0270513 A1 * | 11/2011 | Shida | B60W 30/165 | 701/117 |
| 2011/0270514 A1 | 11/2011 | Shida | | |
| 2012/0109421 A1 | 5/2012 | Scarola | | |
| 2012/0123658 A1 * | 5/2012 | Kagawa | B60W 30/16 | 701/93 |
| 2012/0316725 A1 * | 12/2012 | Trepagnier | G01S 17/023 | 701/26 |
| 2013/0024075 A1 * | 1/2013 | Zagorski | B60W 30/095 | 701/46 |
| 2013/0030688 A1 * | 1/2013 | Shimizu | G08G 1/161 | 701/301 |
| 2013/0041576 A1 * | 2/2013 | Switkes | G08G 1/166 | 701/123 |
| 2013/0066511 A1 * | 3/2013 | Switkes | G08G 1/166 | 701/28 |
| 2013/0147684 A1 | 6/2013 | Lazzaro et al. | | |
| 2013/0211624 A1 * | 8/2013 | Lind | G05D 1/0278 | 701/2 |
| 2014/0236449 A1 * | 8/2014 | Horn | B60W 30/16 | 701/96 |
| 2014/0316865 A1 | 10/2014 | Okamoto | | |
| 2015/0336547 A1 * | 11/2015 | Dagan | B60T 7/22 | 701/70 |
| 2016/0054735 A1 * | 2/2016 | Switkes | G08G 1/22 | 701/23 |
| 2017/0287233 A1 * | 10/2017 | Nix | G07C 5/008 | |
| 2017/0344023 A1 * | 11/2017 | Laubinger | G05D 1/0272 | |
| 2018/0068496 A1 * | 3/2018 | Nix | G07C 5/008 | |
| 2019/0079538 A1 * | 3/2019 | Switkes | G05D 1/0272 | |

FOREIGN PATENT DOCUMENTS

| | | |
|---|---|---|
| JP | 2001233086 A | 8/2001 |
| JP | 2009035067 A | 2/2009 |
| JP | 2011219056 A | 4/2011 |

(56) References Cited

FOREIGN PATENT DOCUMENTS

| WO | 2013006826 A2 | 1/2013 |
| WO | 2013147684 A1 | 10/2013 |
| WO | 2014003630 A1 | 1/2014 |

OTHER PUBLICATIONS

International Search Report (dated Jun. 23, 2016) for corresponding International App. PCT/EP2016/053888.

* cited by examiner

METHOD OF CONTROLLING INTER-VEHICLE GAP(S)

The present application is the U.S. national stage of International Application PCT/EP2016/053888, filed Feb. 24, 2016, which is a continuation-in-part of International Application PCT/EP2015/054029, filed Feb. 26, 2015, both of which are incorporated by reference.

BACKGROUND AND SUMMARY

The invention relates to vehicles, and to methods of controlling inter-vehicle gap(s) between a lead vehicle and one or more following vehicles. The invention also relates to a computer program, a computer readable medium, and a control unit. The invention can for example be applied in heavy-duty vehicles, such as trucks and buses.

Inter-vehicle gap may be controlled using radar-based adaptive cruise control (ACC) that keeps a safe distance to the vehicle in from by controlling the accelerator and brakes.

Cooperative adaptive cruise control (CACC) is an extension of ACC. In CACC, information may be sent from the vehicle ahead to the following vehicle using vehicle to vehicle communications, which information may be used by the following vehicle to even better keep the aforementioned safe distance to the vehicle ahead.

It is desirable to provide an improved method of controlling inter-vehicle gap(s).

According to the first aspect, there is provided a vehicle configured to perform the steps of: obtaining an indicator of a potential collision threat identified by an autonomous emergency braking system of the vehicle, wherein the autonomous emergency braking system of the vehicle comprises pre-defined control phases, and wherein the indicator at least partly determines a current control phase of the autonomous emergency braking system; and sending the obtained indicator to one or more following vehicles. The vehicle may be referred to as a lead vehicle.

The pre-defined control phases of the autonomous emergency braking system may for example be standardized or statutory. The present invention is based on the understanding that by sending said indicator obtained from the (lead) vehicle's autonomous emergency braking system to the following vehicle(s), the following vehicle(s) can due to the pre-defined control phases of the autonomous emergency braking system predict what the lead vehicle will do and take appropriate pre-emptive action.

The indicator may be time to collision (TTC). Other indicators could be relative speed between the potential collision threat and the lead vehicle, distance between the potential collision threat and the lead vehicle, etc.

According to the second aspect, there is provided a method of controlling inter-vehicle gap(s) between a lead vehicle and one or more following vehicles, wherein the method comprises the steps of: obtaining an indicator of a potential collision threat identified by an autonomous emergency braking system of the lead vehicle, wherein the autonomous emergency braking system of the lead vehicle comprises pre-defined control phases, and wherein the indicator at least partly determines a current control phase of the autonomous emergency braking system; and sending the obtained indicator to the one or more following vehicles. This aspect may exhibit the same or similar features and/or technical effects as the first aspect of the invention, and vice versa.

The method may further comprise: receiving, in the one or more following vehicles, said indicator; and automatically adjusting the inter-vehicle gap(s) based on the received indicator.

The indicator may be time to collision.

Sending the indicator may be performed using vehicle-to-vehicle communication means.

Receiving the indicator may also be performed using vehicle-to-vehicle communication means.

The method may further comprise: obtaining, in the one or more following vehicles, a reading from one or more on-board sensors that measure the actual gap to a vehicle ahead; and automatically adjusting the inter-vehicle gap(s) based on the obtained reading. By automatically adjusting the inter-vehicle gap(s) based on the aforementioned received indicator and the obtained reading, a refined cooperative adaptive cruise control system may be realized.

The one or more on-board sensors may include at least one radar or at least one LIDAR device or at least one camera.

The received indicator may override the obtained reading in case the received indicator indicates a greater deceleration (of the following vehicle(s)) than the obtained reading, whereas the obtained reading may override the received indicator in case the obtained reading indicates a greater deceleration (of the following vehicle(s)) than the received indicator.

According to the third aspect of the invention, there is provided a vehicle configured to perform the steps of: receiving, in the vehicle, an indicator of a potential collision threat identified by an autonomous emergency braking system of a lead vehicle, wherein the autonomous emergency braking system of the lead vehicle comprises predefined control phases, and wherein the indicator at least partly determines a current control phase of the autonomous emergency braking system; and automatically adjusting an inter-vehicle gap based on the received indicator. This aspect may exhibit the same or similar features and/or technical effects as the previous aspects of the invention, and vice versa.

The indicator may be time to collision.

The vehicle may be referred to as a following vehicle.

According to the fourth aspect, there is provided a method of controlling inter-vehicle gap(s) between a lead vehicle and one or more following vehicles, wherein the method comprises the steps of: receiving, in the one or more following vehicles, an indicator of a potential collision threat identified by an autonomous emergency braking system of the lead vehicle, wherein the autonomous emergency braking system of the lead vehicle comprises pre-defined control phases, and wherein the indicator at least partly determines a current control phase of the autonomous emergency braking system; and automatically adjusting the inter-vehicle gap(s) based on the received indicator. This aspect may exhibit the same or similar features and/or technical effects as the previous aspects of the invention, and vice versa.

The indicator may be time to collision.

The method may further comprise: obtaining, in the one or more following vehicles, a reading from one or more on-board sensors that measure the actual gap to a vehicle ahead; and automatically adjusting the inter-vehicle gap(s) based on the obtained reading.

The one or more on-board sensors may include at least one radar or at least one LIDAR device or at least one camera.

The received indicator may override the obtained reading in case the received indicator indicates a greater deceleration than the Obtained reading, whereas the obtained reading may override the received indicator in case the obtained reading indicates a greater deceleration than the received indicator.

The invention also relates to a computer program comprising program code means for performing steps of the second or fourth aspect of the invention when said program is run on a computer.

The invention also relates to a computer readable medium carrying a computer program comprising program code means for performing steps of the second or fourth aspect of the invention when said program product is run on a computer.

The invention also relates to a control unit configured to perform steps of the second or fourth aspect of the invention. The control unit may for example be included in the lead vehicle and/or the following vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
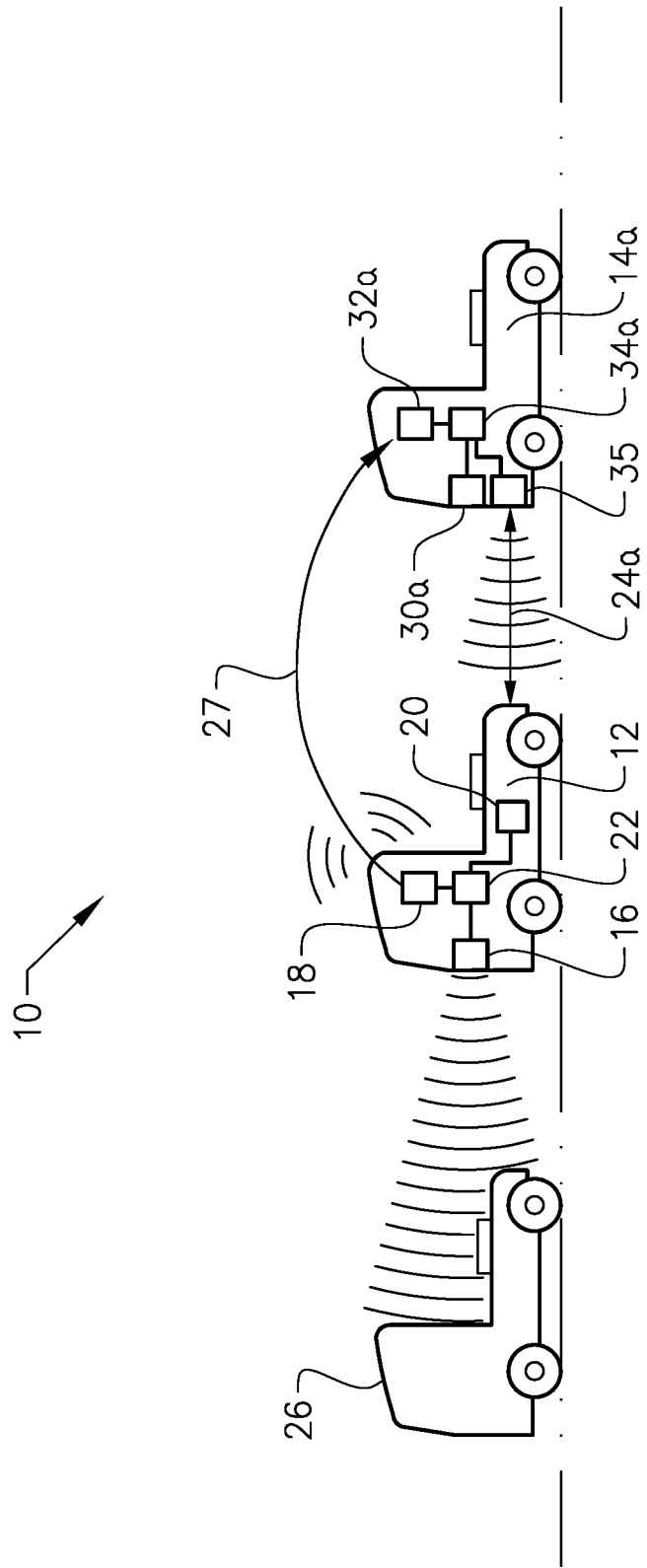
FIG. 1 schematically illustrates a lead vehicle and a following vehicle incorporating aspects of the present invention.

FIG. 1 is a side view of a first vehicle 12 and a second vehicle 14a. The first vehicle may be referred to as a lead vehicle 12, and the second vehicle may be referred to a following vehicle 14a. The vehicles 12, 14a may be motored road vehicles, although at least one of them may have a trailer. The vehicles 12, 14a may be heavy-duty vehicles, such as trucks and busses, or cars.

The lead vehicle 12 comprises an autonomous emergency braking (AEB) system 16, vehicle-to-vehicle (V2V) communication means 18, an optional human machine interface (HMI) 20, and an electronic control unit (ECU) 22. The control unit 22 is connected to the AEB system 16, the V2V communication means 18, and the optional HMI 20.

The AEB system 16 may also be referred to as an advanced emergency braking system (AEBS). The AEB system 16 is adapted to identify a potential collision threat 26, and to derive a safety indicator 27 in the form of time to collision (TTC) for the identified collision threat 26. The time to collision may be derived by relative speed and distance between the lead vehicle 12 and the potential collision threat 26 (steady conditions where all vehicles are laterally stationary in the same lane), although accelerations, driver response, lateral threats etc. could also be taken into account (dynamic conditions). The time to collision may for example be expressed in seconds. The potential collision threat 26 may for example be another vehicle which is in the predicted path of the lead vehicle 12. The AEB system 16 is further adapted to automatically decelerate or brake the lead vehicle 12 depending on the derived time to collision.

Figure 2:
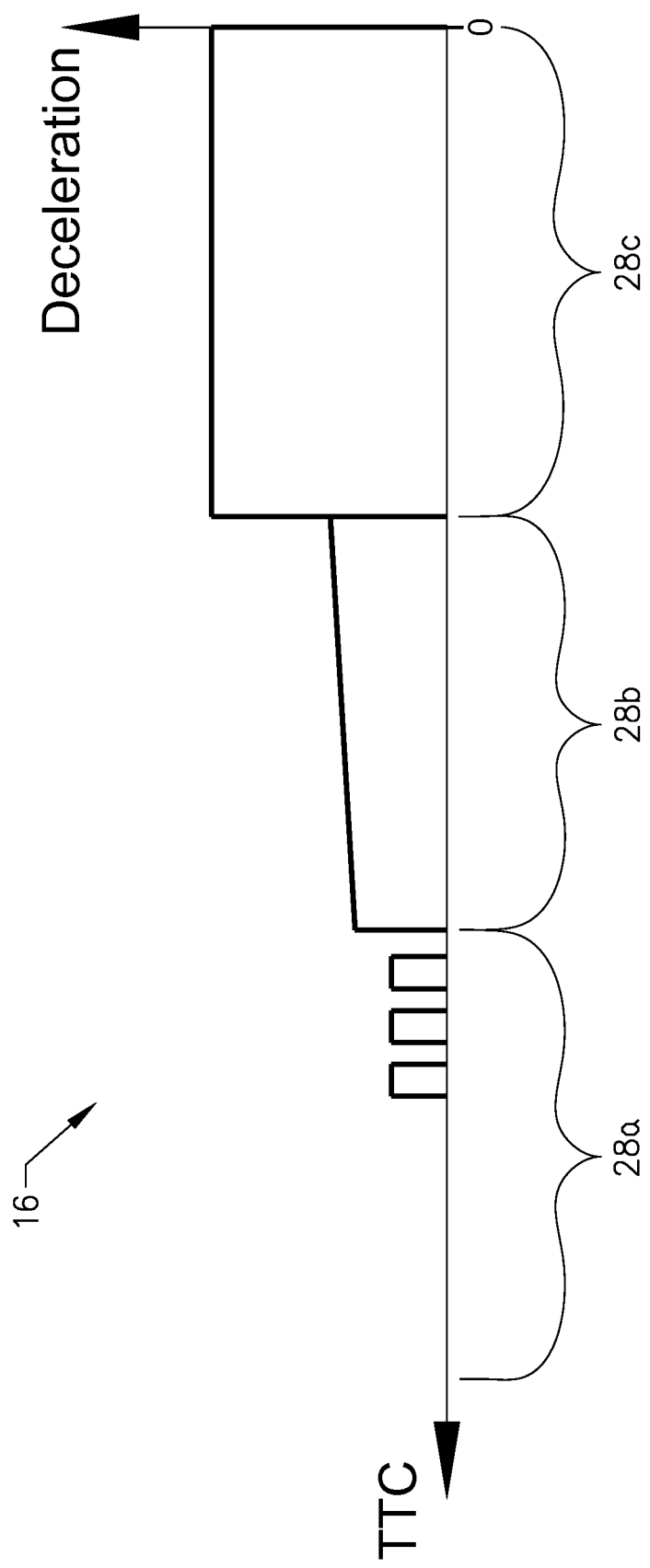
FIG. 2 illustrates pre-defined control phases of an autonomous emergency braking system of the lead vehicle in FIG. 1.

Specifically, the AEB system 16 comprises pre-defined control phases 28a-c, as illustrated in FIG. 2. In FIG. 2, the horizontal axis is time to collision, and the vertical axis is deceleration. The pre defined control phases 28a-c may for example be standardized or statutory (determined by law). The pre-defined control phases 28a-c includes a first alert phase 28a, a second warning brake phase 28b, and a third full brake phase 28c. The current control phase 28a-c depends on the derived time to collision. In the alert phase 28a, the driver of the lead vehicle 12 is alerted that the potential collision threat 26 has been detected. The alert in this phase 28a can for example be optical, acoustic, and/or include some light pulsed braking. The latter is illustrated in FIG. 2. In the warning brake phase 28b, the AEB system 16 automatically decelerates the lead vehicle 12 by applying braking and/or lowered throttle. The deceleration may increase as the time to collision gets shorter, as illustrated in FIG. 2. Finally, in the full brake phase 28c, the AEB system 16 automatically applies full braking to the lead vehicle 12.

The vehicle-to-vehicle communication means 18 is generally adapted to send data to, and/or to receive data from, the following vehicle 14a. In particular, the V2V communication means 18 may be used to send the derived time to collision from the lead vehicle 12 to the following vehicle 14a. The V2V communication means 18 may for example be based on WLAN, such as the IEEE802.11p standard.

The human machine interface 20 is generally adapted to present information to the driver of the lead vehicle 12. The HMI interface 20 may for example be a display on the dashboard of the lead vehicle 12.

Turning to the following vehicle 14a, the following vehicle 14a comprises an automatic longitudinal control system 30a, vehicle-to-vehicle (V2V) communication means 32a, and an electronic control unit (ECU) 34a. The control unit 34a is connected to the automatic longitudinal control system 30a and the V2V communication means 32a.

The automatic longitudinal control system 30a is generally adapted to automatically control the throttle/braking/speed of the following vehicle 14a base on at least one input. In particular, the automatic longitudinal control system 28a may be used to automatically adjust the gap 24a to the vehicle ahead 12 based on the derived time to collision of the AEB system 16, as will be explained further below. The automatic longitudinal control system 30a could, also adjust the gap 24a to the vehicle ahead based on readings from one or more on-board sensors 35 that measure the actual gap 24a to the vehicle ahead, which vehicle ahead in FIG. 1 is the lead vehicle 12.

The one or more sensors 35 are on board the following vehicle 14a. The one or more sensors 35 may be connected to the control unit 34a. The one or more sensors 35 may be at least one radar. Alternatively, the care or more sensors 35 may be at least one LIDAR ("light detection and ranging") device using laser light, or at least one camera.

The vehicle-to-vehicle communication means 32a is generally adapted to receive data from other vehicles, such as the lead vehicle 12. In particular, the V2V communication means 32a may be used to receive the derived time to collision from the lead vehicle 12. Like the vehicle-to-vehicle communication means 18 of the lead vehicle 12, the V2V communication means 32a may be based on WLAN, such as the IEEE802.11p standard.

Figure 3:
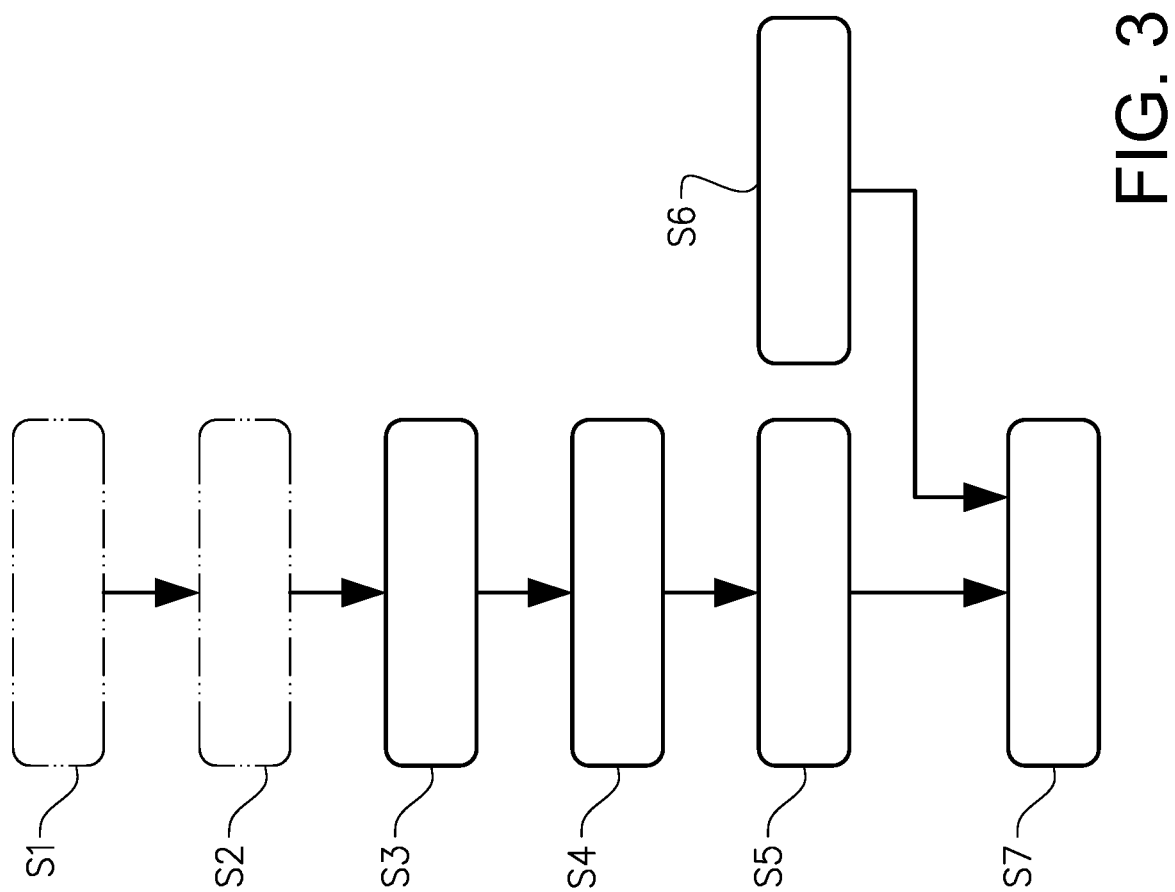
FIG. 3 is a flow chart of a method of controlling inter-vehicle gap between the lead vehicle and the following vehicle of FIG. 1.
Figure 4:
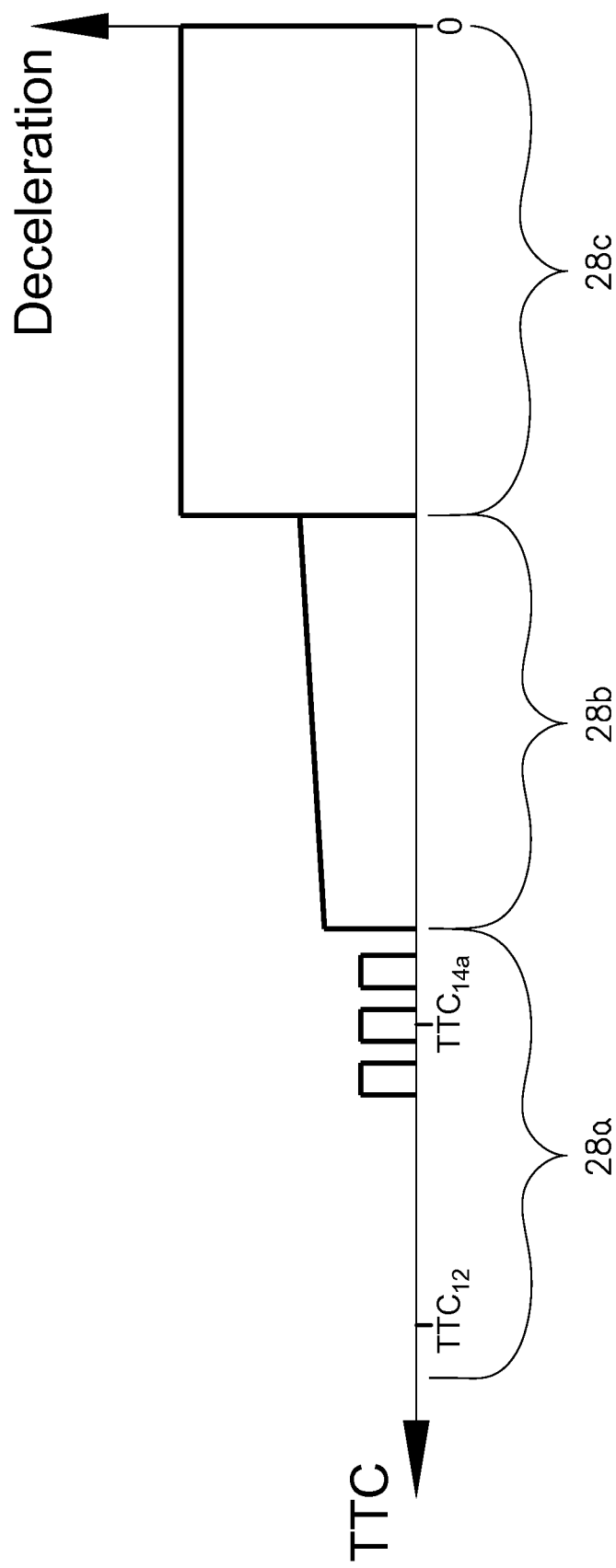
FIG. 4 illustrates pre-defined control phases in the context of the method of FIG. 3.

In operation, and with further reference to FIGS. 3 and 4, the inter-vehicle gap 24a, i.e. the time and/or distance between the lead vehicle 12 and the following vehicle 14a, may be controlled as follows:

The AEB system 16 of the lead vehicle 12 identities the potential collision threat 24 (step S1), and starts deriving the time to collision TTC (step S2).

The derived TTC is obtained by the control unit 22 (step S3), and sent from the lead vehicle 12 to the following vehicle 14a (step S4) via the V2V communication means 18, as indicated by reference sign 27 in FIG. 1.

In the following vehicle 14a, the TTC is received via the V2V communication means 32a (step S5). The following vehicle 14a may also obtain a reading from its onboard sensor(s) 35 (step S6), which reading represents the current gap 24a to the vehicle ahead, in this case the lead vehicle 12. The received TTC and the obtained reading may be used by the control unit 34a for automatically adjusting the inter-vehicle gap 24a (step S7) by means of the automatic longitudinal control system 30a.

The steps S1-S7, or at least steps S2-S7, may be performed continuously.

The pre-defined control phases 28a-c of the lead vehicle's AEB system 16 are generally known. Therefore, by receiving (only) the TTC the following vehicle 14a can predict what the lead vehicle 12 will do and take pre-emptive action accordingly, without having to communicate the control phases 28a-c in advance from the lead vehicle 12 to the following vehicle 14a using V2V communication. The pre-defined control phases 28a-c can for example be pre-stored in the control unit 34a of the following vehicle 14a.

Alternatively, information about the control phases 28a-c can be sent from the lead vehicle 12 to the following vehicle 14a, using V2V communication.

For automatically adjusting the inter-vehicle gap 24a based on the received TTC, the following vehicle 14a may subtract a predetermined time from the received TTC. The received TTC is in FIG. 4 denoted TTC12. The following vehicle 14a subtracts the predetermined time resulting in a reduced TTC14a. The received TTF12 (i.e. the TTC for the lead vehicle) and the reduced TTC14a are illustrated in FIG. 4. In FIG. 4, it can be seen that the lead vehicle 12 is in early alert phase 28a, without deceleration. The following vehicle 14a on the other hand has a TTC14a which corresponds to late alert phase 28a, and its automatic longitudinal control system 30a may therefore apply light pulsed braking corresponding to that of the alert phase 28a, whereby the gap 24a is slightly increased. Since the increase in gap size in FIG. 4 is started before the full brake phase 28c, the control of the gap 24a is far less sensitive to delays in the V2V communication.

Figure 5:
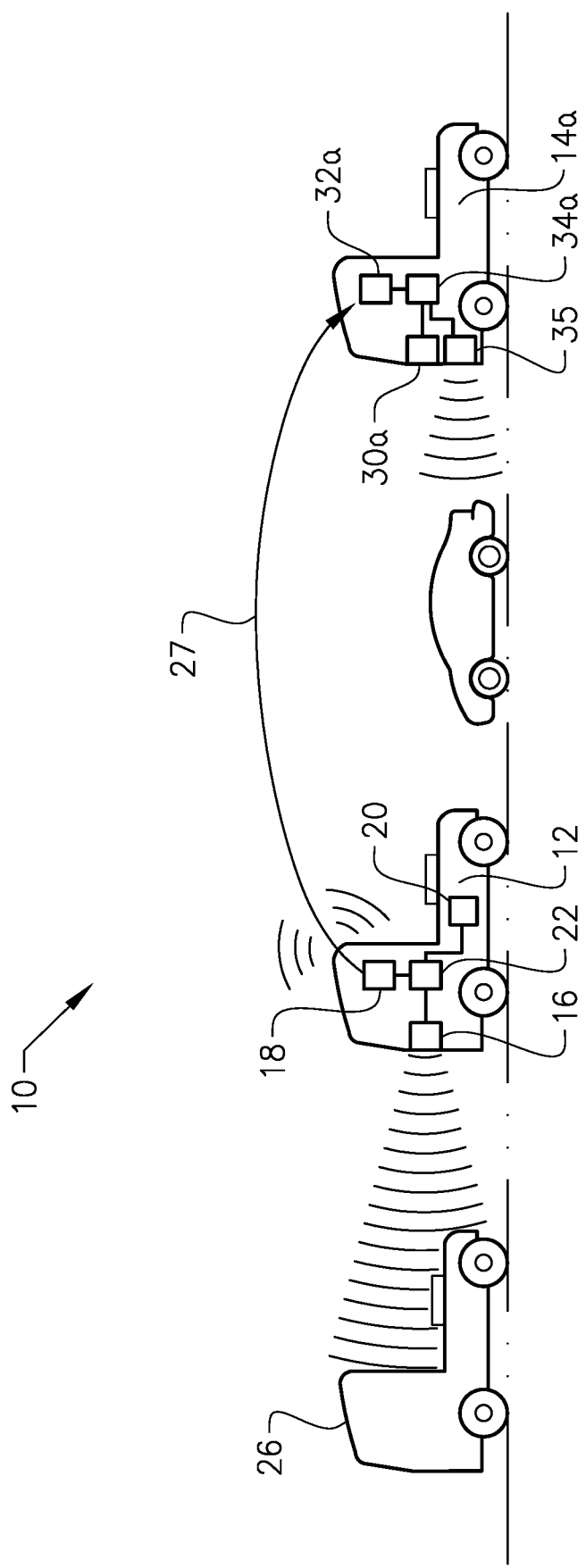
FIG. 5 illustrates a lead vehicle and a following vehicle and an intermediate vehicle.

When no potential collision threat 26 is identified, the gap 24a is automatically adjusted based on the reading from the sensor(s) 35, like traditional adaptive cruise control. However, when a potential collision threat 26 is identified, the received TTC may be used to override the reading from the sensor(s) 35. For example, even if the reading from the sensors) 35 indicates that the gap 24a is increasing, which normally would indicate that the following vehicle 14a can increase its speed to decrease the gap 24a, the received TTC may indicate that the lead vehicle 12 is on its way to start emergency braking, whereby the following vehicle 14a instead increases the gap 24a for increased safety. In another example, the reading from the sensor(s) 35 may indicate that the gap 24a must be increased somewhat, whereas the received TTC may indicate that an emergency brake is very imminent, whereby the following vehicle 14a must decelerate or brake more than what is indicated by the reading from the sensor(s) 35. Hence, also in this example the received TTC overrides the reading from the on-board sensor(s) 35. On the other hand, if for example another vehicle 36 suddenly "squeezes" itself in between the lead vehicle 12 and the following vehicle 14a (see FIG. 5), the reading from the sensor(s) 35 may indicate that the following vehicle 14a must decelerate more than the received TTC indicates (a potential collision threat 26 may have been identified, but it is not that imminent, i.e. it is still far away from the lead vehicle 12), in order to maintain a safe gap to the vehicle ahead, which now is the intermediate vehicle 36. Hence, in this case the obtained reading from the sensor(s) 35 overrides the received TTC.

The methods of the present invention may further comprise: determining a deceleration capacity for the lead vehicle 12 based on a friction estimation, whereby the step of automatically adjusting the inter-vehicle gap 24a may include taking into account also said deceleration capacity. In this way, the lead vehicle 12 may remain predictable for the following vehicle 14a, even if a slippery road (low friction) reduces the deceleration capacity and calls for earlier braking. If for example the current deceleration capacity of the lead vehicle 12 is determined to be lower than the deceleration capacity on dry tarmac because the road is wet and slippery (low friction), the warning brake and full brake phases may be modified with respect to duration, start, and/or deceleration. The aforementioned friction may de estimated in various ways:

An optical sensor on the lead vehicle 12 or on the roadside may detect the physical state of the road surface, such as dry, wet, snow, ice, etc. The detected physical state is then translated into a friction estimation a look-up table.

The difference between measured level of slip between a driving wheel or an engine braking wheel and free rolling wheel may be used. The difference in slip together with the difference in torque on the driving/engine braking wheel as well as the gravity (normal force) on the wheel give the mathematical basis for calculating or estimating the friction.

Measured lateral slip at a specific steering angle may be used. A yaw rate sensor or relative positioning between GNNS (global navigation satellite system) receivers in different parts of the vehicle gives a yaw rate which may be compared to a theoretical or mathematical yaw rate at a certain speed and steering angle and weight distribution on different axes, certain level of differential brake, etc.

Measured rotational resistance of the power steering at a certain steering angle speed and steering angle may be used to estimate the friction, in particular at low speeds.

Interventions of the vehicle's ESP (electronic stability program) or ABS (anti-lock braking system) system may be used to estimate the friction.

It is to be understood that the present invention is not limited to the embodiments described above and illustrated in the drawings; rather, the skilled person will recognize that many changes and modifications may be made within the scope of the appended claims. For example, the vehicles 12 and 14a may be configured to act as both lead vehicle and following vehicle. In this way, each vehicle can function as lead vehicle or as following vehicle depending on the circumstances. Also, there may be one or more additional following vehicles that receives the TTC from the lead vehicle. Also, the present invention can be used in a platoon. Also, the present invention can function without the reading from the on-board sensor(s) 35, for example if the following vehicle 14a has no ACC or if its ACC is turned off.

The invention claimed is:

1. A vehicle configured to perform the steps of:
determining a time to a potential collision threat identified by using an autonomous emergency braking system of the vehicle, wherein the autonomous emergency braking system of the vehicle comprises pre-defined control phases the pre-defined control phases comprising a first alert phase, a second warning brake phase, and a third full brake phase, and wherein a current one of the control phases depends on the determined time to collision; and
sending the determined time to collision to one or more following vehicles,
wherein the determined time to collision is based on a relative speed between the potential collision threat and the lead vehicle or on a distance between the potential collision threat and the lead vehicle.

2. A method of controlling inter-vehicle gap(s) between a lead vehicle and one or more following vehicles, wherein the method comprises the steps of:
determining a time to a potential collision threat identified by an autonomous emergency braking system of the lead vehicle, wherein the autonomous emergency braking system of the lead vehicle comprises pre-defined control phases, the pre-defined control phases comprising a first alert phase, a second warning brake phase, and a third full brake phase, and wherein a current one of the control phases depends on the determined time to collision;
sending the determined time to collision to the one or more following vehicles;
receiving, in the one or more following vehicles, the determined time to collision;
obtaining, in the one or more following vehicles, a reading from one or more on-board sensors that measure an actual gap to a vehicle ahead, and
automatically adjusting inter-vehicle gap(s) based on the received determined time to collision or the obtained reading,
wherein the received determined time to collision overrides the obtained reading when the received determined time to collision indicates a greater deceleration than the obtained reading, and wherein the obtained reading overrides the received determined time to collision when the obtained reading indicates a greater deceleration than the received time to collision.

3. A method according to claim 2, wherein sending the determined time to collision is performed using vehicle-to-vehicle communication means.

4. A method according to claim 2, wherein receiving the determined time to collision is performed using vehicle-to-vehicle communication means.

5. A method according to claim 2, wherein the one or more on-board sensors include at least one radar or at least one LIDAR device or at least one camera.

6. A method of controlling inter-vehicle gap(s) between a lead vehicle and one or more following vehicles, wherein the method comprises the steps of:
receiving, in the one or more following vehicles, an indicator of a potential collision threat identified by an autonomous emergency braking system of the lead vehicle, wherein the autonomous emergency braking system of the lead vehicle comprises pre-defined control phases, the pre-defined control phases comprising a first alert phase, a second warning brake phase, and a third full brake phase, wherein a current one of the control phases depends on the determined time to collision;
obtaining, in the one or more following vehicles, a reading from one or more on-board sensors that measure an actual gap to a vehicle ahead; and
automatically adjusting the inter-vehicle gap(s) based on the determined time to collision or the obtained reading,
wherein the received determined time to collision overrides the obtained reading when the received determined time to collision indicates a greater deceleration than the obtained reading, and wherein the obtained reading overrides the received determined time to collision when the obtained reading indicates a greater deceleration than the received time to collision.

7. A method according to claim 6, wherein the one or more on-board sensors include at least one radar or at least one LIDAR device or at least one camera.

* * * * *